United States Patent [19]
Czech et al.

[11] 4,447,671
[45] May 8, 1984

[54] FUNNEL-SHAPED SUPPORT INSULATOR AND A HIGH-VOLTAGE ARRANGEMENT USING THE SUPPORT INSULATOR

[75] Inventors: Franz Czech, Niederhasli; Miroslav Subotic, Zürich, both of Switzerland

[73] Assignee: BBC Brown, Boveri & Company, Limited, Baden, Switzerland

[21] Appl. No.: 426,958

[22] Filed: Sep. 29, 1982

[30] Foreign Application Priority Data

Oct. 8, 1981 [CH] Switzerland .................. 6448/81

[51] Int. Cl.³ .................. H02G 9/06; H01B 17/58; H01B 9/04
[52] U.S. Cl. .................. 174/28; 174/99 B; 174/167
[58] Field of Search .................. 174/14 R, 16 B, 21 C, 174/22 C, 27, 28, 99 R, 99 B, 99 E, 111, 167

[56] References Cited

FOREIGN PATENT DOCUMENTS 547024 3/1974 Switzerland .................. 174/14 R

Primary Examiner—Laramie E. Askin
Attorney, Agent, or Firm—Burns, Doane, Swecker & Mathis

[57] ABSTRACT

A funnel-shaped support insulator is mounted by its insulator outer edge in a recess of a grounded housing and has an orifice which is provided at a distance from the housing and in which a high-voltage conductor part is retained. To prevent, in this insulator, inadmissible field increases and glow discharges associated with these in the region of the outer edge of the insulator, the insulator has a wall thickness decreasing from the orifice to the outer edge of the insulator. A plurality of lobes engaging the housing are located at the outer edge of the insulator. An insulator of this type is to be used preferably in metal-encased high-voltage switch gear.

10 Claims, 4 Drawing Figures

FUNNEL-SHAPED SUPPORT INSULATOR AND A HIGH-VOLTAGE ARRANGEMENT USING THE SUPPORT INSULATOR

BACKGROUND AND SUMMARY OF THE PRESENT INVENTION

The present invention relates generally to insulators. More specifically, the present invention relates to a funnel-shaped support insulator for a high voltage conductor retained in a tubular housing.

An insulator of this type is known, for example, from Swiss Patent Specification No. 547,024. The insulator described there has a uniform wall thickness and is anchored by its outer edge in a recess of a grounded metal housing part. On both sides of the outer edge of the insulator there are annular grooves which are open inwards in the housing part and which act as a particle trap because of the reduced electrical field prevailing there. However, in the case of an insulator mounted and designed in this way, voltage increases and harmful glow discharges associated with these cannot be prevented, especially at the groove edges adjacent to the insulator.

One primary object of the invention is, therefore, to develop the insulator of the type in question in such a way that it is possible to obtain a retention of the insulator on the grounded housing part which retention is free of inadmissible field increases and which can be carried out by simple means.

This object and others are achieved by providing the funnel-shaped support insulator with a wall thickness which decreases from an inner edge of the insulator towards its outer edge and in which a plurality of lobes engaging the housing are located on the outer edge of the insulator. The insulator according to the invention is characterized in that there are in its outer regions, adjacent to grounded housing parts, electrical field gradients which are specific and can therefore be monitored easily, so that harmful phenomena, such as glow discharges, are virtually eliminated.

If the insulator according to the invention has the lobes projecting beyond the outer edge of the insulator in both an axial and a radial direction, then the electrical field-strength distribution at the outer edge of the insulator can be monitored particularly well, since the outer edge of the insulator has on all sides an exactly specific distance from the grounded housing. As a result, voltage increases and consequently glow discharges between the grounded housing and the insulator can be prevented in an especially simple way.

If the insulator according to the invention has the lobes cast in one piece with the insulator, then this insulator can, furthermore, be produced in an especially simple and economical way. At the same time good preconditions are provided for arranging the insulator largely free of stress in the housing.

A further embodiment of the insulator has a corrugated surface facing the conductor with depressions being provided in the corrugated surface. There is as little solid insulation as possible in the region of the lobes making the engagement with the grounded housing, thereby ensuring an additional improvement of the field-strength conditions in the outer edge regions of the insulator according to the invention.

If the insulator according to the invention has the depressions made as recesses, and parts of the edge of the insulator are removed, then its dielectric properites are also additionally improved because of the supplementary reduction of solid insulation in the edge regions.

BRIEF DESCRIPTION OF THE DRAWINGS

An exemplary embodiment of the invention is described below in simplified form with reference to the drawings in which.

DETAILED DESCRIPTION OF THE PREFERRED EMBODIMENT

Figure 1:
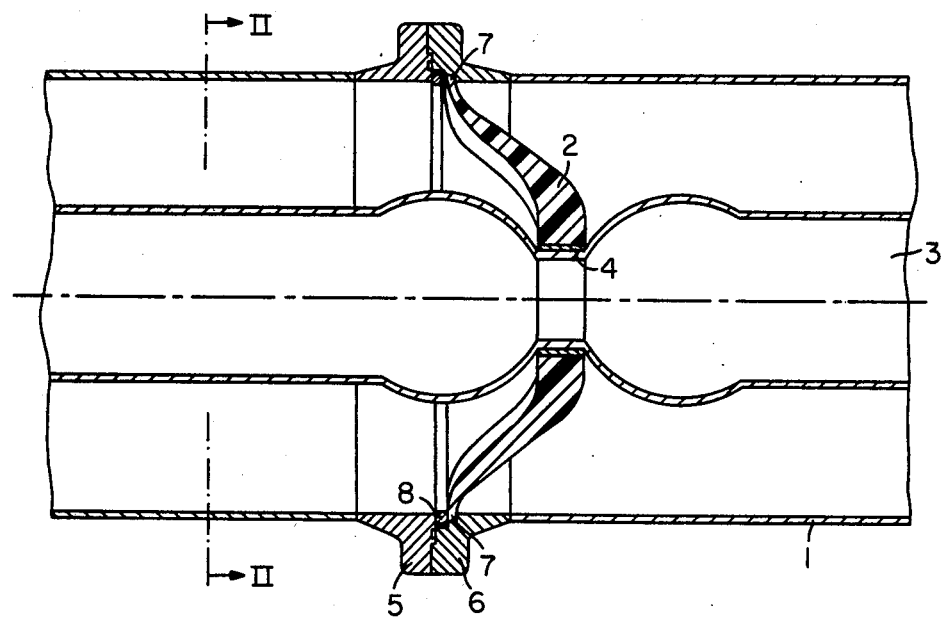
FIG. 1 is a plan view of an axial section through a gas-filled tubular cable section in which an insulator designed according to the invention effects the retention of a high-voltage inner conductor located in a grounded housing filled with insulating gas.

In all the figures, identical parts bear the same reference numerals. FIG. 1 shows a cut-out from a metal-encased gas-insulated gas-filled tubular cable in which an insulator 2 according to the invention, retained in the inner wall of the metal housing 1, is provided for supporting a high-voltage inner conductor 3. The inner conductor 3 is connected electrically conductively to an electrode 4. The electrode 4 is attached in an orifice of the insulator 2 and is preferably cast together with this. The electrode 4 controls the electrical field between the inner conductor 3 and housing 1 and prevents glow discharges from occurring in the region between the insulator 2 and inner conductor 3. The housing 1 is composed of sections which are connected to one another in a gas-tight manner by the use of two flanges 5 and 6. This gas-tight connection can be made, for example, by bracing the two flanges 5 and 6, possibly by screws, with a gasket interposed between them, or by welding.

In the flange 6 there is, on the side facing the inner conductor 3, a recess into which engage lobes 7 made of insulating material. These lobes 7 are located on the outer edge of the insulator and are distributed over its periphery. The lobes 7 are fixed by a retaining ring 8 likewise located in the recess. Fixing can be effected, for example, by suitable shaping of the retaining ring 8 and clamping of the retaining ring 8 and lobes 7 as a result of bracing the flanges 5 and 6. Fixing can also be effected by cutting thread turns in the outer face of the retaining ring 8 and the inner face of the recess at the location of the retaining ring 8 and clamping the lobes 7 as a result of rotation of the thread-guided retaining ring 8.

Figure 2:
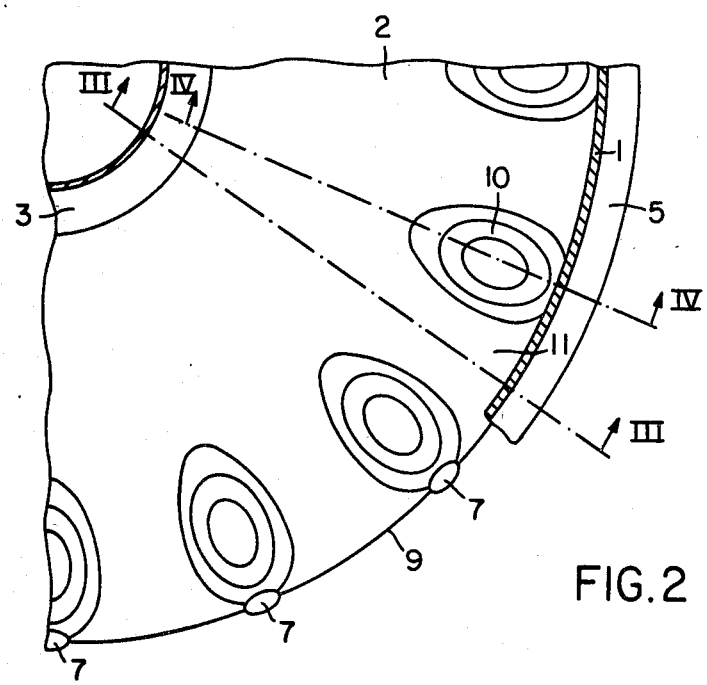
FIG. 2 is a plan view of a part of the gas-filled tubular cable according to FIG. 1, shown enlarged and in a section along line II—II, in which parts of the grounded housing are removed.

In the plan view, reproduced in FIG. 2, of part of the gas-filled tubular cable 3 shown enlarged, parts of the housing 1 and of the flange 5 belonging to the housing 1 have been removed at the outer edge 9 of the insulator. Thus, it is possible to see the position and shape of the lobes 7. The lobes 7 preferably have an ellipsoid form and contain an insulating material. They can consist, for example, of the same material as the insulator 2, that is to say, for examlple, of a hardened epoxy resin containing filling material, and can be connected in one piece to this, for example by casting. The lobes 7 are preferably distributed uniformly over the outer edge 9 of the insulator, in order thereby to ensure a uniform mechanical load on the lobes 7 and on the outer edge 9 of the insulator. The lobes 7 project beyond the outer edge 9 of the insulator all around, as a result of which a specific distance, which is preferably greater than 0.3 mm, is formed between the edge of the insulator 2 located in the recess of the flange 6, and the grounded flange 6.

Depressions 10 may also be seen in FIG. 2. These depressions 10 are part of the corrugated surface of the insulator 2. The delimitations of these depressions 10 are represented by curved lines. At the curved lines the concave surfaces of the depressions 10 merge into convex surfaces.

Figure 3:
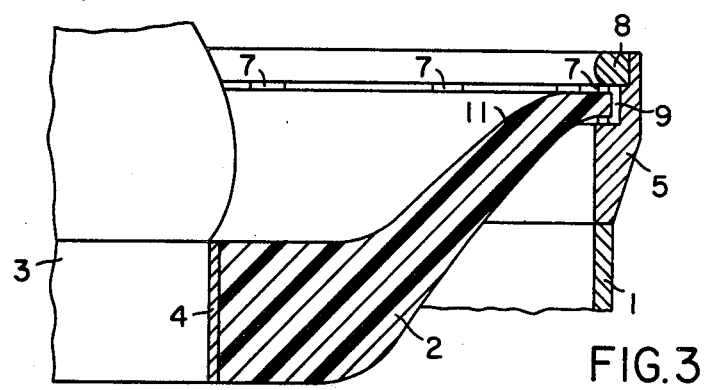
FIG. 3 is a plan view of an axial section of the gas-filled tubular cable according to FIG. 2, taken along III—III.
Figure 4:
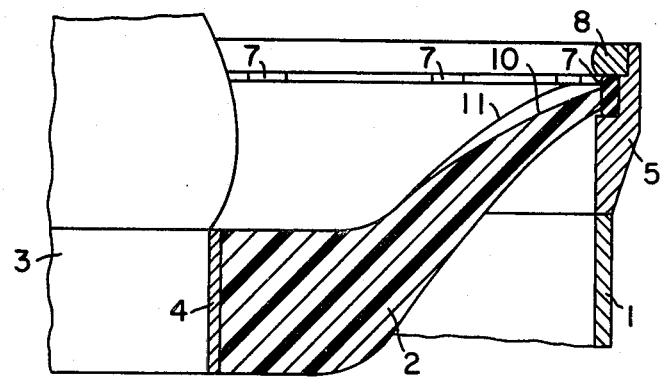
FIG. 4 shows a plan view of an axial section through the gas-filled tubular cable according to FIG. 2, taken along line IV—IV.

This is illustrated once again in FIGS. 3 and 4. It can be seen from the plan views, shown there, of the axial sections through the gas-filled tubular cable according to FIG. 2, taken along III—III and IV—IV, that the wall thickness of the insulator 2 decreases continuously from the inner conductor 3 to the outer edge 9 of the insulator. The axial section III—III leads through a region 11 of the insulator 2 in which there is a convex surface between two depressions 10. The wall of the insulator is accordingly relatively thick there. On the other hand the axial section IV—IV leads through the region of the insulator 2 in which the wall of the insulator 2 is comparatively thin because of the depressions 10. It can be seen from FIGS. 2 to 4 that the depressions 10 extend into the vicinity of the outer edge 9 of the insulator. The lobes 7 are each attached to the insulator 2 at points where the depressions 10 terminate at the outer edge 9 of the insulator. This ensures that the lobes 7 are surrounded by a relatively large quantity of insulating gas, with the result that considerable stress relief is provided of the points of contact between the lobes 7 and the grounded flange 6 which are in danger from glow discharges. It is especially advantageous here, if, because of the lobes 7 projecting beyond and all around the outer edge 9 of the insulator, the outer edge 9 of the insulator is at a specific distance from the grounded flange 6. This is advantageous since this distance can be calculated directly in such a way that even under unfavorable conditions, glow discharges are prevented between the insulator 2 and the grounded flange 6. If sulfur hexafluoride is used as an insulating gas, a distance of 0.3 mm is sufficient to prevent harmful electrical discharges in the case of voltages up to a few hundred kilovolts, for example 800 kV, and at an operating pressure of the insulating gas of a few, for example, 5 bar. In general, however, a minimum distance of 1 mm is to be recommended.

A further improvement in the dielectric properties of the support insulator according to the invention can be achieved by providing material recesses at the locations of the depressions 10 or by removing parts of the outer edge 9 of the insulator and adjoining parts of the insulator 2 and likewise providing material recesses in the remaining insulator arms.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A funnel-shaped support insulator, comprising:
   an insulator body having an outer edge and an orifice spaced inwardly from said edge for supporting at least one high-volatge conductor part,
   said body having an at least partially convex surface terminating at said outer edge, and having a wall thickness which decreases from said orifice toward said outer edge,
   said outer edge having a plurality of lobes, said outer edge being free of control electrodes and being adapted for engaging at least one inner side of a metal housing.

2. The insulator of claim 1, wherein the lobes project beyond the outer edge of the insulator both in an axial direction and in a radial direction.

3. The insulator of claim 2, wherein the lobes are cast in one piece with the insulator.

4. The insulator of claim 1, wherein said at least partially convex surface is corrugated and has depressions terminating at said outer edge of said insulator body, the lobes being located at the ends of said depressions, said ends terminating at the outer edge of the insulator body.

5. The insulator of claim 4, wherein the depressions are made as recesses, and wherein parts of the outer edge of the insulator are removed.

6. In a high voltage arrangement having a tubular metal housing filled with an insulating gas, at least one high-voltage conductor part being located in said housing and being supported by at least one insulator retained in the housing, the improvement wherein the insulator comprises an insulator body having an outer edge and an orifice spaced inwardly from said edge for supporting said high-voltage conductor part spaced at a distance from said housing,
   said body having an at least partially convex surface terminating at said outer edge, and having a wall thickness which decreases from said orifice towards said outer edge,
   said outer edge having a plurality of lobes, the outer edge engaging an inner side of the metal housing and being free of control electrodes.

7. The arrangement of claim 6 wherein the lobes project beyond the outer edge of the insulator body both in an axial direction and in a radial direction.

8. The arrangement of claim 7 wherein the lobes are cast in one piece with the insulator body.

9. The arrangement of claim 6 wherein the at least partially convex surface is corrugated and has depressions terminating at the outer edge of the insulator body, the lobes being located at the ends of the depressions, the ends terminating at the outer edge.

10. The arrangement of claim 9, wherein the depressions are made as recesses and parts of the outer edge of the insulator body are removed.

* * * * *